(12) United States Patent
Leeseberg et al.

(10) Patent No.: US 11,047,501 B2
(45) Date of Patent: Jun. 29, 2021

(54) NORMALLY OPEN GAS VALVE

(71) Applicants: Tony Leeseberg, Elgin, IL (US); Stephen Sapp, Itasca, IL (US); Curtis Phillips, Bloomingdale, IL (US); James E. Pearson, Downers Grove, IL (US)

(72) Inventors: Tony Leeseberg, Elgin, IL (US); Stephen Sapp, Itasca, IL (US); Curtis Phillips, Bloomingdale, IL (US); James E. Pearson, Downers Grove, IL (US)

(73) Assignee: Robertshaw Controls Company, Itasca, IL (US)

( * ) Notice: Subject to any disclaimer, the term of this patent is extended or adjusted under 35 U.S.C. 154(b) by 49 days.

(21) Appl. No.: 16/035,065

(22) Filed: Jul. 13, 2018

(65) Prior Publication Data

US 2019/0017622 A1 Jan. 17, 2019

Related U.S. Application Data

(60) Provisional application No. 62/532,866, filed on Jul. 14, 2017.

(51) Int. Cl.
| | | |
|---|---|---|
| *F16K 31/06* | (2006.01) | |
| *F16K 39/02* | (2006.01) | |
| *F16K 1/20* | (2006.01) | |

(52) U.S. Cl.
CPC ............ *F16K 31/0682* (2013.01); *F16K 1/20* (2013.01); *F16K 31/0655* (2013.01); *F16K 39/028* (2013.01)

(58) Field of Classification Search
CPC ... F16K 1/20; F16K 1/36; F16K 25/00; F16K 25/005; F16K 31/0655; F16K 31/0682; F16K 31/10; F16K 39/028

USPC ............. 251/84, 86, 129.2, 235, 236, 242
See application file for complete search history.

(56) References Cited

U.S. PATENT DOCUMENTS

| | | | |
|---|---|---|---|
| 2,160,117 A | 5/1939 | Borresen | |
| 2,215,954 A | 9/1940 | Borresen | |
| 2,228,588 A | 1/1941 | Ray | |
| 2,398,452 A | 4/1946 | Shaw | |
| 2,430,107 A | 11/1947 | Cronrath | |
| 2,549,188 A | 4/1951 | Forsnas | |
| 2,956,770 A | 10/1960 | Galley | |
| 3,090,592 A | 5/1963 | Fleer | |
| 3,143,131 A * | 8/1964 | Spencer | F16K 31/10 137/269 |

(Continued)

FOREIGN PATENT DOCUMENTS

| | | |
|---|---|---|
| CN | 1153876 A | 7/1997 |
| JP | 11-294619 A | 10/1999 |

(Continued)

*Primary Examiner* — Seth W. MacKay-Smith
(74) *Attorney, Agent, or Firm* — Reinhart Boerner Van Deuren P.C.

(57) ABSTRACT

Embodiments of a normally open gas valve are disclosed herein. The normally open gas valve includes a valve plug that gradually or partially disengages from the valve seat such that the actuation power required to open the valve is substantially reduced. The force required to open or close the valve is also reduced through the use of an off-center lever arm that multiplies the force applied by the armature of the actuation means. In this way, a less expensive actuation means, e.g., a less expensive solenoid, is able to be used to actuate the normally open gas valve.

12 Claims, 3 Drawing Sheets

(56) References Cited

U.S. PATENT DOCUMENTS

| | | | |
|---|---|---|---|
| 3,263,693 A | 8/1966 | Ages | |
| 3,410,301 A | 11/1968 | Merriner et al. | |
| 3,603,559 A | 9/1971 | Totten | |
| 4,170,339 A | 10/1979 | Ueda et al. | |
| 4,268,009 A * | 5/1981 | Allen, Jr. | F16K 31/10 |
| | | | 251/129.2 |
| 4,418,886 A | 12/1983 | Holzer | |
| 4,446,889 A | 5/1984 | Sakakibara et al. | |
| 4,635,494 A | 1/1987 | Conklin | |
| 4,889,314 A | 12/1989 | Hashizume et al. | |
| 4,958,774 A | 9/1990 | Taylor | |
| 5,040,567 A | 8/1991 | Nestler et al. | |
| 5,090,441 A | 2/1992 | Richmond | |
| 5,140,876 A | 8/1992 | Fields | |
| 5,145,145 A | 9/1992 | Pick et al. | |
| 5,403,230 A | 4/1995 | Capriglione, Sr. | |
| 5,674,002 A | 10/1997 | Powell et al. | |
| 5,681,508 A * | 10/1997 | Gerhardy | F02M 17/04 |
| | | | 137/505.46 |
| 5,709,370 A | 1/1998 | Kah, Jr. | |
| 5,762,097 A | 6/1998 | Hettinger et al. | |
| 5,772,181 A * | 6/1998 | Robertson, III | F16K 1/16 |
| | | | 251/129.06 |
| 5,921,009 A | 7/1999 | Hice | |
| 5,954,311 A | 9/1999 | Thorpe | |
| 6,014,917 A | 1/2000 | Bally et al. | |
| 6,178,855 B1 | 1/2001 | Bally et al. | |
| 6,311,951 B1 | 11/2001 | Samulowitz | |
| 6,318,213 B1 | 11/2001 | Hendrix et al. | |
| 6,349,487 B1 | 2/2002 | Hice | |
| 6,591,797 B2 | 7/2003 | Entzminger | |
| 6,748,846 B2 * | 6/2004 | Haerr | F16K 11/052 |
| | | | 137/596.17 |
| 6,830,231 B2 * | 12/2004 | Paessler | F16K 31/0682 |
| | | | 251/129.16 |
| 7,021,603 B2 * | 4/2006 | Wygnaski | F16K 31/0682 |
| | | | 251/129.15 |
| 7,111,444 B1 | 9/2006 | Morris et al. | |
| 7,172,532 B2 | 2/2007 | Baker | |
| 7,226,034 B2 * | 6/2007 | Stark | F16K 31/10 |
| | | | 251/129.19 |
| 7,226,304 B1 | 6/2007 | Stark et al. | |
| 7,226,393 B2 | 6/2007 | Baker | |
| 7,309,303 B1 | 12/2007 | Proctor | |
| 7,364,533 B2 | 4/2008 | Baker | |
| 8,453,992 B2 * | 6/2013 | Palmer | F16K 31/42 |
| | | | 251/129.16 |
| 10,120,395 B2 * | 11/2018 | Ishida | F16K 1/36 |
| 2008/0179556 A1 | 7/2008 | Lasa et al. | |
| 2010/0038572 A1 | 2/2010 | Alvarez et al. | |
| 2011/0155931 A1 | 6/2011 | Weiss | |

FOREIGN PATENT DOCUMENTS

| | | |
|---|---|---|
| JP | 2001-235051 A | 8/2001 |
| KR | 10-0181332 B1 | 4/1999 |
| WO | WO 95-14874 A1 | 6/1995 |

* cited by examiner

NORMALLY OPEN GAS VALVE

CROSS-REFERENCE TO RELATED PATENT APPLICATIONS

This patent application claims the benefit of U.S. Provisional Patent Application No. 62/532,866, filed Jul. 14, 2017, the entire teachings and disclosure of which are incorporated herein by reference thereto.

FIELD OF THE INVENTION

This invention generally relates to valves and more particularly to a gas valve.

BACKGROUND OF THE INVENTION

Valves are used in many applications in which the control of the flow of a process fluid is needed. Such process fluids may include liquids, such as oil, fuel, water, etc., or gases such as, e.g., natural gas, oxygen, etc. Some valves operate to meter the flow of fluid therethrough and operate by accurately positioning the valving member to control the amount of fluid allowed to pass through the valve. Other valves operate in a switching fashion wherein the flow of fluid therethrough is either turned on or turned off. Such valves may be utilized, for example, in consumer and commercial appliances such as furnaces, stoves, ovens, driers, etc., whereby gas is allowed to flow for a predetermined period of time or until a predetermined volume has been dispensed therethrough. The control of the operation of such valves is typically performed by an electronic control circuit, such as a microprocessor-based controller, along with its associated drive circuitry, to open and/or close the valving member within the valve.

A problem with such switching valves is the force necessary to open the valving member against the static pressure of the process fluid acting on one side of the valving member. Depending on the application, this pressure may be quite high, particularly when compared with the low pressure on the opposite side of the valving member which, in many appliance applications, is at atmospheric pressure.

Many electronically controlled switching valves include an electrically actuated solenoid which acts on a plunger connected to the valving member to move the valving member to its open position. Unfortunately, due to the high pressure differentials that exist for a closed valve, the actuator needs to be relatively large so that it is able to reliably operate the valve under all operating conditions and installations. In many industries, such as the consumer appliance industry, strict Governmental and certifying agency requirements place a heavy premium on an electric power usage. As such, these direct acting solenoid controlled valves that include solenoids sized to reliably open the valving member provide a significant disadvantage to the appliance manufacturer in being able to attain agency certification as, for example, as an Energy Star rated appliance. Further, the appliance industry is highly competitive and the cost of such large solenoid actuators also provides a significant detriment to their use.

Embodiments of the present invention provide a normally open valve having reduced material and operational costs while still providing reliable actuation and long operational life. These and other advantages of the invention, as well as additional inventive features, will be apparent from the description of the invention provided herein.

BRIEF SUMMARY OF THE INVENTION

Embodiments of a normally open gas valve are disclosed herein. The normally open gas valve includes a valve plug that gradually or partially disengages from the valve seat such that the actuation power required to open the valve is substantially reduced. The force required to open or close the valve is also reduced through the use of an off-center lever arm that multiplies the force applied by the armature of the actuation means. In this way, a less expensive actuation means, e.g., a less expensive solenoid, is able to be used to actuate the normally open gas valve.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Embodiments of a normally open gas valve are disclosed herein. Advantageously, the normally open gas valve includes a valve plug that gradually or partially disengages from the valve seat such that the actuation power required to open the valve is substantially reduced. The force required to open or close the valve is also reduced through the use of an off-center lever arm that multiplies the force applied by the armature of the actuation means. In this way, a less expensive actuation means, e.g., a less expensive solenoid, is able to be used to actuate the normally open gas valve. While a normally open gas valve is described herein, other valve types (e.g., normally closed) for other fluid media (e.g., water) would also benefit from the valve components and configuration described herein. Thus, exemplary embodiments of the normally open gas valve discussed herein are provided by way illustration only and not by way of limitation.

Figure 1:
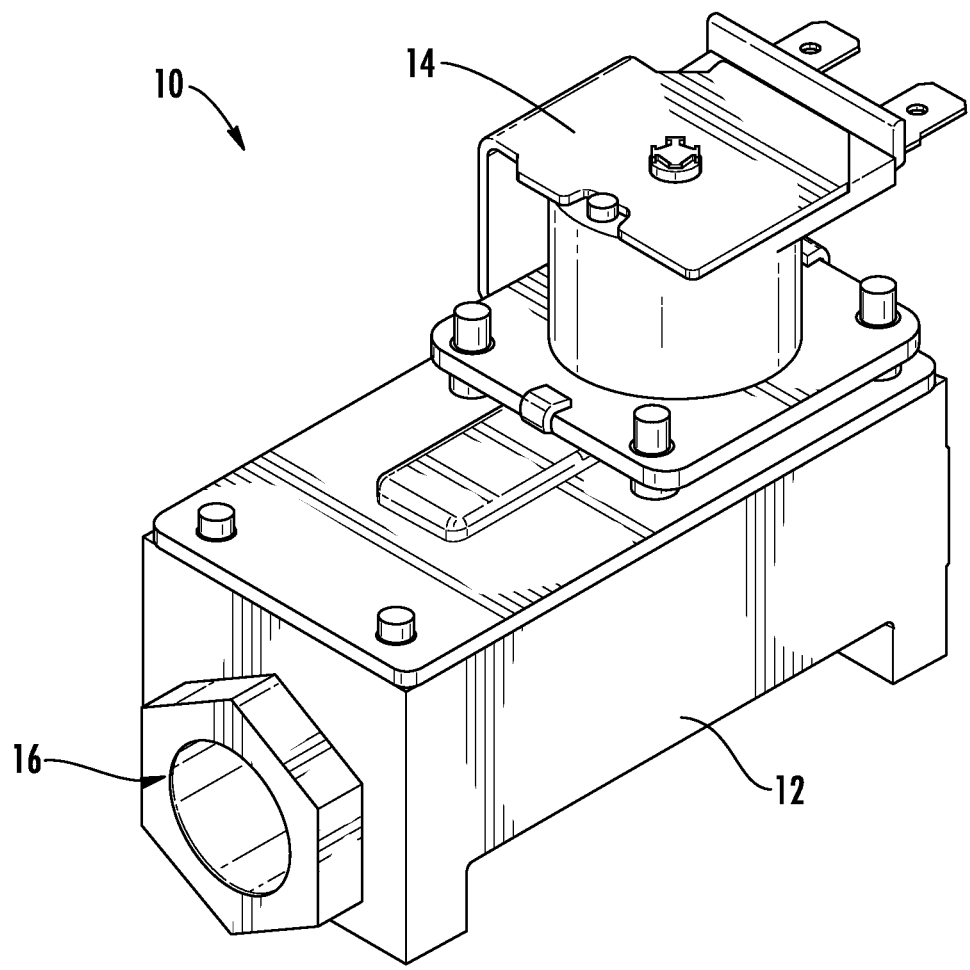
FIG. 1 is a perspective view of an exemplary embodiment of a normally open gas valve, according to the teachings herein.
Figure 2:
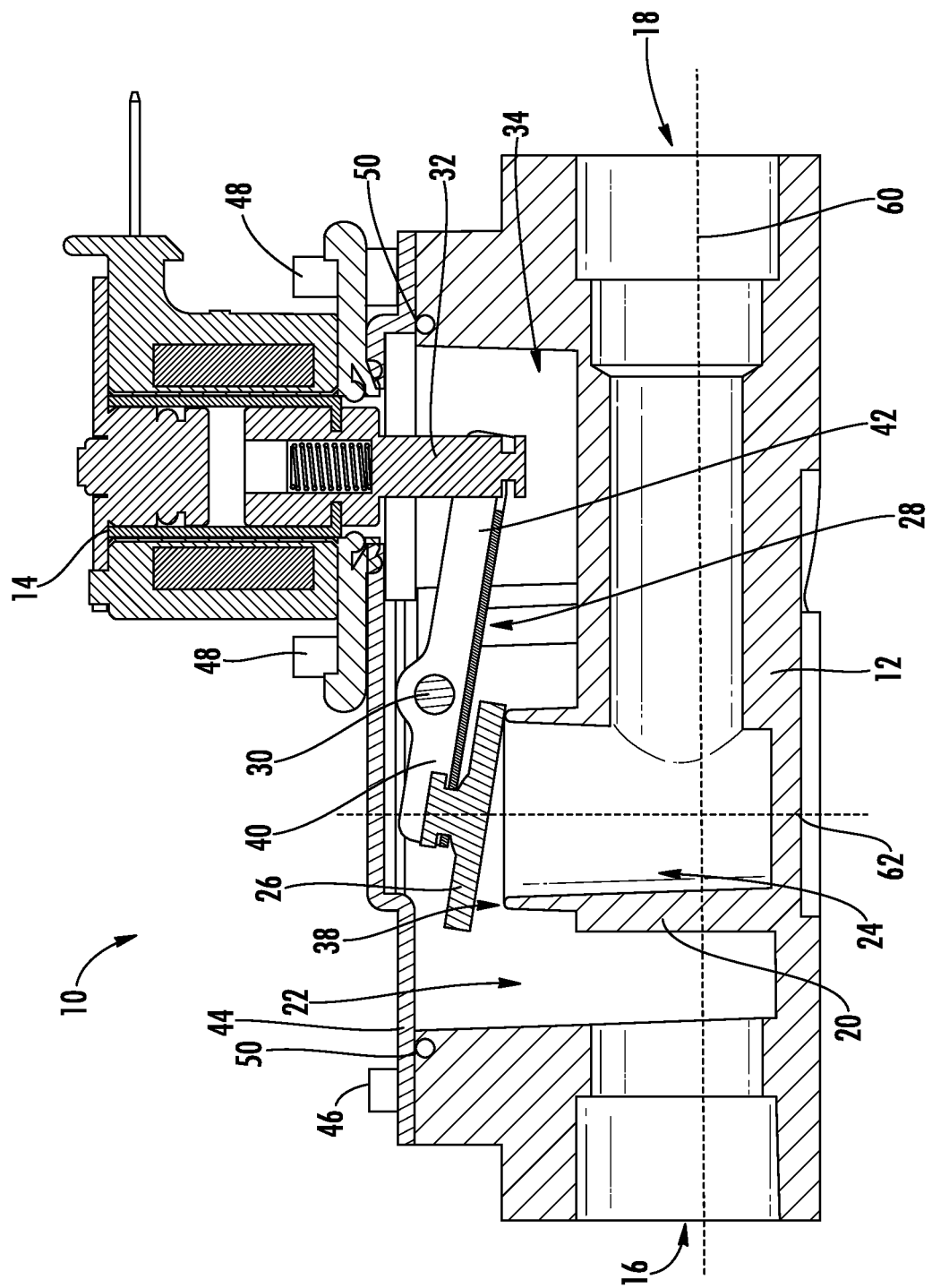
FIG. 2 is a cross-sectional view of the normally open gas valve as depicted in FIG. 1.

With reference to FIG. 1, a normally open gas valve 10 is depicted. Broadly, the normally open gas valve 10 includes a valve body 12 and an actuation means, such as a rotary to linear motor, pneumatic actuator, hydraulic actuator, etc. The actuation means of the embodiment depicted in the figures is a solenoid 14. The solenoid 14 controls the flow of a fluid through the valve body from an inlet 16 to an outlet 18 that is shown in FIG. 2. While the use of "inlet" and "outlet" may be read to imply a fluid flow direction from left to right as shown in FIG. 2, these terms are used primarily for ease of illustration, and fluid could instead flow from right to left depending on the configuration of the valve and the application in which it is used. Further, "solenoid" is used generally to refer to any of a variety of solenoid-type actuators, such as direct action solenoids, latching solenoids, indirect-acting pneumatic or hydraulic solenoids, etc.

In FIG. 2, the internal structure and components of the normally open gas valve 10 are depicted. In the illustrated embodiment of normally open gas valve 10, fluid is designed to flow through the valve body 12 from the inlet 16 to the outlet 18. A partition wall 20 within the valve body 12 establishes an inlet chamber 22, which is in fluid communication with the inlet 16, and an outlet chamber 24, which is in fluid communication with the outlet 18. Flow from the inlet chamber 22 to the outlet chamber 24 is allowed or prevented based on the positioning of a valve plug 26. In FIG. 2, the valve plug 26 is shown in the open position, which in a normally open gas valve 10 is the default position.

The movement of the valve plug 26 from the open position to the closed position, or vice versa, is controlled by a lever arm 28. In particular, the lever arm 28 rotates about a fulcrum bar 30 upon actuation of armature 32 of the solenoid 14. That is, upon energization of the solenoid 14, the armature 32 moves upward (with respect to the orientation of the normally open gas valve 10 shown in FIG. 2), causing the lever arm 28 to rotate counterclockwise about the fulcrum bar 30. In this way, a downward force from the lever arm 28 is applied to the valve plug 26 to move it into the closed position. As the embodiment shown and described is a normally open gas valve 10, the energization of the solenoid 14 closes the normally open gas valve 10. However, in a normally closed valve, the energization of the solenoid would open the valve. In such an embodiment, the mechanism could remain the same, but the armature 32 would move downward instead of upward to actuate the valve to the open position.

The opening and closing of the normally open gas valve 10 can also be described in terms of the direction of the forces applied. In that regard, the inlet 16 and outlet 18 of the valve body 12 both have cross-sectional areas centered on a common flow axis referred to as first axis 60. The partition wall 20 is arranged concentrically about a second axis 62, which is perpendicular to the first axis 60. Application of a force at one end of the lever arm 28 will create a force that is initially parallel to the second axis 62 but immediately deviates from parallel with the second axis 62. Thereafter, the force will be tangential to the arc traced by the rotation of the lever arm 28 about the fulcrum bar 30.

In an embodiment, the lever arm 28 is an off-center lever such that the lever arm 28 includes a short arm portion 40 and a long arm portion 42 that are separated by fulcrum bar 30. The use of an off-center lever for the lever arm 28 allows for force multiplication. Specifically, according to the principles of leverage, the torque created by the armature 32 upon energization of the solenoid 14 through the application of an upward force at the end of the long arm portion 42 is the same as the torque on the valve plug 26 at the end of the short arm portion 40. However, because the short arm portion 40 is shorter than the long arm portion 42, the force component of the torque is multiplied. In a specific embodiment, the short arm portion 40 less than or equal to half the length of the long arm portion 42 such that the force provided by the armature 32 is at least doubled at the valve plug 26. Further, the length of each arm portion 40, 42 may be customized based on, among other factors, the anticipated fluid force and solenoid sizing requirements to provide a requisite degree of force multiplication.

The armature 32 moves upwardly and downwardly within the inlet chamber 22. The partition wall 20 provides a valve plug seat 38 at a terminal end thereof. The valve plug 26 entirely and sealingly engages the valve plug seat 38 in a closed position. Creation of the seal between the valve plug 26 and the valve plug seat 38 is facilitated also by the fluid pressure from fluid in the inlet chamber 22. That is, when the valve plug 26 is in the closed position, the pressure in the inlet chamber 22 will be greater than the pressure in the outlet chamber 24, thereby urging the engagement between the valve plug 26 and the valve plug seat 38.

In the fully open position as shown in FIG. 2, the valve plug 26 at most only partially engages the valve plug seat 38. In particular, the end of the valve plug 26 engaging the partition wall 20 may, in some embodiments, remain in contact with the partition wall 20 while the normally open gas valve 10 is in the open position. In such an embodiment, the partition wall 20 also operates as a fulcrum to facilitate disengagement of the valve plug 26 form the valve plug seat 38.

In transitioning from the closed position to the open position, the valve plug 26 "peels" from the valve plug seat 38 in embodiments. That is, the valve plug 26 gradually disengages the valve plug seat 38 as the lever arm 28 moves the valve plug 26 into the open position. In embodiments, the peeling action is facilitated by forming the valve plug 26 from a reversibly deformable material, such as rubber, that will cause an end of the valve plug 26 to bend upwardly upon application of an upward force of the lever arm 28 (caused by downward motion of the armature 32). Put differently, a top surface of the valve plug 26 in the closed position may define a planar surface such that upon initial opening of the valve plug 26 a side of the valve plug bends out of the plane defined by the top surface of the valve plug 26. In another embodiment, the peeling action is caused by forming a groove in the underside of the valve plug 26 into which the valve plug seat 38 is inserted. In this way, as the valve plug 26 is lifted, the seal between the valve plug 26 and the valve plug seat 38 is gradually broken. In such an embodiment, the valve plug 26 is able to be made of a rigid, resilient, or deformable material.

Advantageously, the gradual disengagement of the valve plug 26 from the valve plug seat 38 means that the force required to move the valve plug 26 to the open position is substantially reduced because the entire seal between the valve plug 26 and valve plug seat 38 does not have to be broken in a single instant. Accordingly, a solenoid 14 supplying a weaker force (generally corresponding to a less expensive solenoid 14) is able to be used, especially when the advantage of peeling the solenoid plug 26 from the valve plug seat 38 is coupled with the force multiplication provided by the off-center lever arm 28.

As can also be seen in FIG. 2, the valve body 12 is closed at the top with a cover 44. The cover 44 is positioned and retained over the valve body 12 via first mounting pins 46 and second mounting pins 48. In the embodiment depicted, the second mounting pins 48 are greater in height than the first mounting pins 46 because the second mounting pins 48 also position and retain the solenoid 14. The cover 44 is sealingly coupled to the valve body 12 via a continuous gasket 50.

Figure 3:
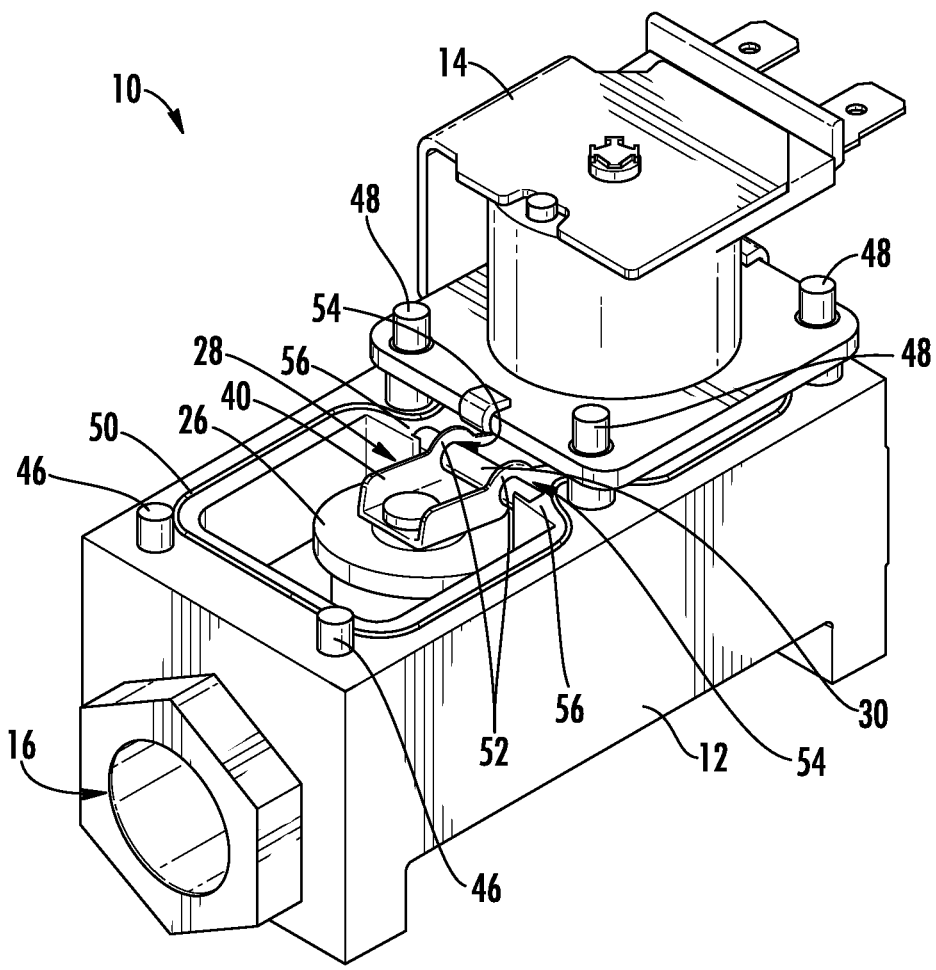
FIG. 3 is a perspective view of the normally open gas valve as depicted in FIG. 1 with the top cover removed so as to show certain valve components contained therein.

The valve body 12 without the cover 44 is depicted in FIG. 3. Thus, in FIG. 3 a view into the valve body 12 is shown. In particular, the engagement between the valve plug 26, lever arm 28, and fulcrum bar 30 is depicted. In the embodiment shown, the lever arm 28 is defined by a U-shaped channel having two ridges 52, and an aperture 54 is formed into each ridge 52. The fulcrum bar 30 is inserted through each aperture 54 of the ridges 52, and two ledges 56 are provided in the valve body 12 to receive the fulcrum bar 30. The ledges 56 prevent movement of the fulcrum bar 30 other than rotation of the fulcrum bar 30.

The embodiments of the normally open gas valve described herein offer several advantages. For certain applications, such as in regulating flow on a pilot line, the normally open gas valve 10 does not have to be powered in the default open condition. Further, the design and substantially reduced opening and closing power consumption mean that the solenoid coil is able to be rated up to continuous duty. Also advantageously, the relatively low power consumption allows for increased insulation such that the solenoid coil is able to be rated at class A, B, or F, depending on operating temperatures. Relatedly, the valve is designed to operate up to 65,000 BTU. Accordingly, the valve disclosed herein provides reduced material costs while still providing reliable actuation and long operational life.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A valve, comprising:
    a valve body having an inlet and an outlet;
    a valve plug configured to engage a valve plug seat in a closed position such that fluid is unable to flow from the inlet to the outlet in the closed position;
    wherein the valve plug gradually disengages the valve plug seat when moving from the closed position to an open position;
    wherein the valve plug maintains at least partial engagement with the valve plug seat when in the open position;
    a solenoid having an armature;
    a lever arm operably coupled to the armature at a first end and to the valve plug at a second end; and
    a fulcrum bar about which the lever arm rotates; and
    wherein energization of the solenoid causes a first force on the first end of the lever arm and a second force on the second end of the lever arm, the second force being in the opposite direction as the first force.

2. The valve of claim 1, wherein the lever arm is comprised of a long portion between the fulcrum bar and the first end of the lever arm and a short portion between the fulcrum bar and the second end of the lever arm and wherein the long portion is at least twice the length of the short portion.

3. The valve of claim 2, wherein the second force is at least twice the magnitude of the first force.

4. A valve, comprising:
    a valve body having an inlet and an outlet;
    a valve plug configured to engage a valve plug seat in a closed position such that fluid is unable to flow from the inlet to the outlet in the closed position;
    wherein the valve plug gradually disengages the valve plug seat when moving from the closed position to an open position;
    wherein the valve plug maintains at least partial engagement with the valve plug seat when in the open position; and
    wherein the valve plug is made of a reversibly deformable material such that the valve plug bends when moving between the closed position and the open position.

5. The valve of claim 4, wherein fluid pressure on the inlet side of the valve body urges the valve plug into engagement with the valve plug seat.

6. A method of opening a valve, wherein the valve comprises a valve plug configured to engage a valve plug seat when the valve is in a closed position, the method comprising the steps of:
    applying a force to a first end of the valve plug;
    gradually lifting the valve plug from the valve plug seat such that the first end of the valve plug increases in separation from the valve plug seat more than a second end of the valve plug until the valve plug reaches an open position;
    maintaining at least partial engagement of the second end of the valve plug with the valve plug seat in the open position;
    wherein the valve further comprises a solenoid having an armature, a lever arm, and a fulcrum, wherein the armature is operably coupled to a first end of the lever arm and the valve plug is operably coupled to a second end of a lever arm, and wherein the step of applying a force to a first end of the valve plug further comprises:
        energizing the solenoid to move the armature and the first end of the lever arm in a first direction;
        rotating the lever arm about the fulcrum; and
        opening the valve by moving the second end of the lever arm in a second direction opposite to the first direction.

7. The method of claim 6, further comprising generating a first force at the first end of the lever arm and generating a second force at the second end of the lever arm, wherein the second force is at least twice the first force.

8. The method of claim 6, further comprising the steps of:
   deenergizing the solenoid to cause a retraction of the armature;
   rotating the lever arm about the fulcrum oppositely to the first rotating step;
   seating the valve plug on the valve plug seat.

9. A valve, comprising:
   a valve body having an inlet and an outlet;
   a valve plug configured to engage a valve plug seat in a closed position such that fluid is unable to flow from the inlet to the outlet in the closed position;
   wherein a top surface of the valve plug defines a plane in the closed position;
   wherein a first end of the top surface bends out of the plane as the valve plug transitions into an open position
   wherein a second end of the valve plug remains in at least partial engagement with the valve plug seat in the open position;
   a solenoid having an armature;
   a lever arm operably coupled to the armature at a first end and to the valve plug at a second end; and
   a fulcrum bar about which the lever arm rotates; and
   wherein energization of the solenoid causes a first force on the first end of the lever arm and a second force on the second end of the lever arm, the second force being in the opposite direction as the first force.

10. The valve of claim 9, wherein the lever arm is comprised of a long portion between the fulcrum and the first end of the lever arm and a short portion between the fulcrum and the second end of the lever arm and wherein the long portion is at least twice the length of the short portion.

11. The valve of claim 10, wherein the second force is at least twice the magnitude of the first force.

12. A valve, comprising:
    a valve body having an inlet and an outlet;
    a valve plug configured to engage a valve plug seat in a closed position such that fluid is unable to flow from the inlet to the outlet in the closed position, the valve plug seat being arranged on a first axis;
    a solenoid having an armature;
    a lever arm having a first end and a second end, the lever arm being operably coupled to the armature at the first end and to the valve plug at the second end; and
    a fulcrum bar about which the lever arm rotates
    wherein actuation of the solenoid causes the armature to move the first end of the lever arm in a first direction such that the lever arm rotates about the fulcrum bar and the second end of the lever arm moves in a second direction opposite to the first direction; and
    wherein the rotation of the lever arm applies a force to the valve plug that deviates from an initial direction parallel to the first direction; and
    wherein the valve plug is made of a reversibly deformable material such that the valve plug bends when moving between the closed position and the open position.

* * * * *